(12) United States Patent
Fandella (10) Patent No.: US 7,757,841 B2
(45) Date of Patent: Jul. 20, 2010

(54) HINGELESS BELT

(75) Inventor: Sergio Fandella, Mogliano Veneto (IT)

(73) Assignee: Habasit AG, Reinach (CH)

( * ) Notice: Subject to any disclaimer, the term of this patent is extended or adjusted under 35 U.S.C. 154(b) by 731 days.

(21) Appl. No.: 11/598,574

(22) Filed: Nov. 13, 2006

(65) Prior Publication Data

US 2008/0110727 A1    May 15, 2008

(51) Int. Cl.
   *B65G 17/06* (2006.01)
(52) U.S. Cl. .................................. 198/850; 198/844.2
(58) Field of Classification Search .............. 198/844.2, 198/850
   See application file for complete search history.

(56) References Cited

U.S. PATENT DOCUMENTS

| | | | | |
|---|---|---|---|---|
| 3,349,893 A | * | 10/1967 | Jordan et al. | 198/690.2 |
| 3,904,028 A | * | 9/1975 | Muller | 198/850 |
| 4,034,617 A | * | 7/1977 | Guyer | 198/847 |
| 4,170,281 A | * | 10/1979 | Lapeyre | 198/844.2 |
| 4,537,658 A | * | 8/1985 | Albert | 162/348 |
| 4,682,686 A | * | 7/1987 | Ueda et al. | 198/850 |
| 4,776,454 A | * | 10/1988 | Momose | 198/853 |
| 5,509,526 A | * | 4/1996 | Bonnet | 198/850 |
| 5,839,571 A | * | 11/1998 | Jakob | 198/844.2 |
| 5,921,378 A | * | 7/1999 | Bonnet | 198/850 |
| 6,234,305 B1 | * | 5/2001 | Brown et al. | 198/844.2 |
| 6,997,307 B2 | | 2/2006 | Iseli | |
| 2004/0089519 A1 | | 5/2004 | Pollak et al. | |
| 2006/0081449 A1 | | 4/2006 | Gundlach | |

FOREIGN PATENT DOCUMENTS

| | | |
|---|---|---|
| EP | 0239660 A1 | 10/1987 |
| EP | 1440921 A1 | 7/2004 |
| FR | 2495050 A1 | 6/1982 |
| GB | 2102714 A | 2/1983 |
| JP | 4179614 A | 6/1992 |

* cited by examiner

*Primary Examiner*—Mark A Deuble
(74) *Attorney, Agent, or Firm*—Hodgson Russ LLP (57) ABSTRACT

A hingeless belt comprises modules having opposed leading and trailing sides, first and second bases and opposed outer sides. The modules are connected to joining members with layers that can be, for example, an adhesive. The joining members comprise an elastic material which allows the modular belt to bend and flex, and the modules are made of a hard thermoplastic material. The modules and joining members resists cuts and impacts, the modules and joining members are easy to clean and keep sanitary. The joining members are embodied with different shapes for enhancing the connection with the modules, and for enhancing the flexibility of the modular belt as it carries load and as it is driven around a sprocket. There is a molding machine having mold members for making the hingeless belt. There is also a method of making the hingeless belt in the molding machine.

18 Claims, 11 Drawing Sheets

HINGELESS BELT

BACKGROUND

Modular belts have modules with leading and trailing eyes, and adjacent modules are positioned such that the leading and trailing eyes are intercalated. A hinge rod is introduced through the intercalated leading and trailing eyes to connect the modules to one another to form a belt. Such belts are typically looped between drive and idler sprockets or drums, and the modules have protrusions that engage the drive sprockets such that the belt can be continuously driven.

Problems exist with respect to maintaining such modular belts in a clean and sanitary condition. For example, in the food industry meat products are commonly conveyed from one work station to the next on a conveyor belt such as the one described above. However, there are spaces between the leading and trailing eyes and rods, and these spaces provide an ideal environment for mold and bacteria growth. In addition, regardless of how often the modular belt is washed, the spaces between the leading and trailing eyes and rods are not cleaned. A thorough washing can only be accomplished by disassembling the modular belt into its individual components, and washing each component separately. Disassembly of the entire modular belt results in undesirable down time and decreased productivity. Thus, there is a need for a modular belt that overcomes the problems associated with such modular belts.

An example of an endless belt design is shown in U.S. Pub. No. 2004/0089519 to Pollak et al. (hereinafter Pollak et al.) that does not have any hinges. The belt described in Pollak et al. is made of homogenous or monolithic materials and made by an extrusion process. However, there are many problems associated with this belt design. The belt material must be flexible enough to allow the belt to bend around the drive and idling drums, which is not always the case with such belts. In addition, the surface of a belt made of such an elastic or monolithic material does not resist scratches, cuts and damage associated with mechanical cutting. In addition, in the food industry, the belt surface is oftentimes subjected to cutting and impacts and the monolithic belt cannot withstand such impacts and cutting. Another problem with such a monolithic belt is that the flexibility of the belt material required to bend around the idler and driving drums results in the belt having a high longitudinal flexibility as well, which is disadvantageous when the belt is under load. Another problem associated with such flexible belts is that there is a frictional load increase. For example, these belts are drawn over supports made of wood, steel plates or steel strips, and the frictional load caused by the belt can be in excess of the frictional load generated when modular plastic belts are drawn over the supports. This has the disadvantage of energy losses, decreased working life of the belt, and limiting the maximum load on the belt.

Thus, there is a need for a belt that is hingeless that does not increase friction or increase power requirements, that can withstand cutting and impact operations, that does not have increased longitudinal flexibility, and that is easy to thoroughly clean.

SUMMARY OF INVENTION

The present invention is a hingeless belt that comprises modules, layers, and joining members. The modules have a generally C-shaped cross section and each has a load side and an opposed recessed module surface, opposed leading and trailing sides, opposed outer sides and spaced apart first and second bases. The modules have a first drive surface and a second drive surface and the recessed module surface extends from the first drive surface to the second drive surface. A sprocket contacts the first and second drive surfaces to drive the hingeless belt. The module comprises a hard thermoplastic material including polypropylene, polyacetal, polyethylene, polyamide or the like. The joining member has opposed first and second joining sides, and opposed joining member load and joining member base sides. Positioned between each joining member and each module is a layer which is an adhesive layer for connecting the modules and joining members. In addition to adhesives, the joining can also be accomplished by, for example, a weld or a thermal bonding process. A tie layer (also referred to herein as foil or foil layer) is also useable for joining the modules, and joining members. The hingeless belt advantageously does not have any spaces or gaps between the modules and joining members and this prevents the accumulation of undesirable debris between the modules, and also advantageously provides for an easy to clean hingeless belt. In addition, because the modules comprise a hard material they can advantageously withstand cutting and impacts.

In another preferred embodiment of the invention, the modules have transverse ribs that extend from the recessed module surface, which advantageously increases contact between the modules and a sprocket.

In another preferred embodiment of the hingeless belt the joining member has a load side and opposed base sides and opposed outer sides. A groove extends from one of the opposed outer sides to the other opposed outer side and wherein the groove is for advantageously increasing the flexibility of the joining member.

In another preferred embodiment of the hingeless belt the module has a first base, a second base, an angled leading side that slopes inwardly in a direction toward the second joined base, and an angled trailing side that slopes inwardly in a direction toward the first base. The joining member has a joining member load side, a first leg having a first internal leg surface, and a second leg each having a second internal leg surface. Each of the first and second legs extends from and slopes in a direction toward a bendable portion that is proximal the joining members load side such that the joining member has a groove that extends from the first internal leg surface to the second internal leg surface. The layer joins the angled leading side and the second leg, and another layer joins the angled trailing side and the first leg to form the modular belt. The angled leading and trailing sides advantageously provide for increased contact area between the modules and layers thus enhancing the connection.

In another preferred embodiment of the hingeless belt module the module has a first leading wall and a recessed second leading wall with a leading contact wall extending from the first leading wall to the recessed leading wall. The module also has a first trailing wall and a recessed second trailing wall with a trailing contact wall that extends from the first trailing wall to the recessed second trailing wall. The joining member has opposed first and second joining member walls, opposed third and fourth joining member walls, wherein a first joining member contact wall extends from the first joining wall to the third joining member wall, and a second joining member contact wall extends from the third joining member wall to the fourth joining member wall. The layer is positioned between the second trailing wall and the first joining member wall, the recessed second trailing wall and the third joining member wall, and the trailing contact wall and the first joining member contact wall. Another layer is positioned between the first leading wall and second joining member wall, the recessed leading wall and the fourth joining member wall, and the leading contact wall and the second joining member contact wall. In this embodiment, the shapes of the module advantageously increases its contact area which advantageously enhances the connection with the joining member.

In another preferred embodiment of the hingeless belt there is a flight joining member that has opposed first and second joining sides, bases, opposed outer sides, and spaced apart flight sides opposite the bases. A flight extends from the flight joining member such that one of the flight sides is on each side of the flight. In this embodiment the flight is advantageously easy to clean and increases the number of applications in which the hingeless belt can be used.

In another preferred embodiment of the hingeless belt there is a first link module having a leading side and an opposed first link end having first links with first openings. A layer connects the leading side to a joining member and another layer connects the joining member to another modules. There is also a second link module having a trailing side and an opposed second link end having second links with second openings. A layer connects the trailing side to a joining member and another layer connects the joining member to another one of the module. The first and the first and second links are intercalated such that the first and second openings align and a pivot rod is positioned in the aligned first and second openings to hold the first and second links together. This embodiment advantageously provides for a way to hold the hingeless module belt together while at the same time minimizing the number of openings in the hingeless belt.

In another preferred embodiment of the hingeless belt each module has a first and second base and opposed outer sides, a slotted leading side having first slots that extend from the slotted leading side and from the second base and a first opening that extends through the module from one of the opposed outer sides to the other opposed outer side, such that the first opening is in communication with the first slots. Each module also has a slotted trailing side having second slots that extend from the slotted trailing side and from the first base and a second opening that extends through the module from one of the opposed outer sides to the other opposed outer side, such that the second opening is in communication with the second slots. Layers are joined to the leading and trailing sides of the modules. An elastic joining material fills the first slots and first opening in the module and the elastic joining material fills the second slots and second opening in the adjacent module. This advantageously provides for a strong mechanical connection between the modules.

The hingeless belt invention also includes a molding machine for making a hingeless belt. The molding machine includes a mold having a first mold member having a first spacing wall and a second spacing wall, and a second mold member, which faces the first mold member, having a first protrusion and a second protrusion. A first cavity is defined by the first spacing wall, the first mold member, the second mold member and the first protrusion. A second cavity is defined by the second spacing wall, the first mold member, the second mold member and the second protrusion. The first cavity and the second cavity are in the shape of a module. The second mold member has a first fill passage that is connected to a reservoir of thermoplastic material and has a second fill passage that is connected to a reservoir of elastic joining material, such that when the mold is closed thermoplastic material can be introduced into the first cavity through the first fill passage. The molding machine has a third mold member having an outer wall that replaces the first mold member. An elongate module cavity is defined between the third mold member and first mold member when the mold is closed. When the mold is closed, elastic joining material is introduced into a space that extends between the layer joined to the leading and trailing sides of the modules. Thus, the hingeless belt can be advantageously made in one molding machine.

There is also provided a method for making a hingeless belt that comprises providing a mold having a first mold member and a facing second mold member. The method includes defining a first cavity by a first spacing wall, the first mold member, the second mold member and a first protrusion such that the first cavity has the shape of a module. The method further includes defining a second cavity by a second spacing wall, the first mold member, the second mold member and a second protrusion, such that the first and second cavities have the shape of a module when the mold is closed. The method also includes opening the mold and placing an already formed module in the second cavity, closing the mold, and injecting a thermoplastic material through a first passage into the first cavity to form another module. The next act is opening the mold and applying a layer to the leading and trailing sides of the modules. This step is followed by providing a third mold member having an outer wall that faces the second mold member, closing the mold, and injecting a elastic material through a second passage such that the elastic material fills the space between the layers. Thus, the hingeless belt can be advantageously made in one molding machine.

BRIEF DESCRIPTION OF THE DRAWING FIGURES

A hingeless belt invention is illustrated throughout the drawing figures. The same reference number is used to call out the same or similar surfaces, structures or features throughout the drawing figures of the embodiments of the hingeless belt invention, wherein.

DESCRIPTION

Figure 1:
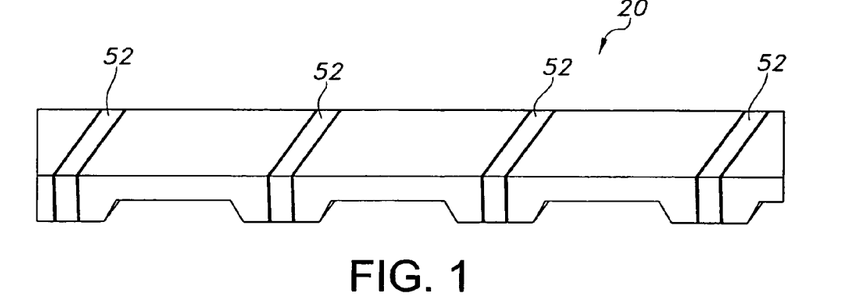
FIG. 1 shows a perspective view of a section of a hingeless belt having modules and joining members according to a first embodiment of the invention.
Figure 2:
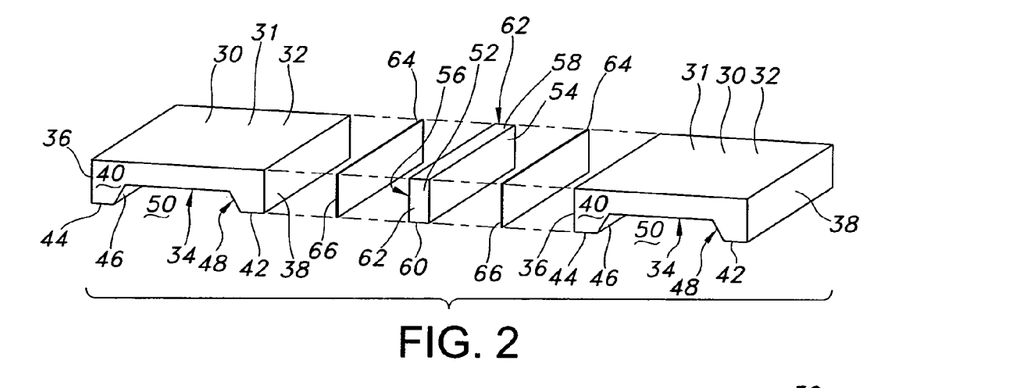
FIG. 2 shows an exploded view of a portion of the hingeless belt.
Figures 3, 4, 5:
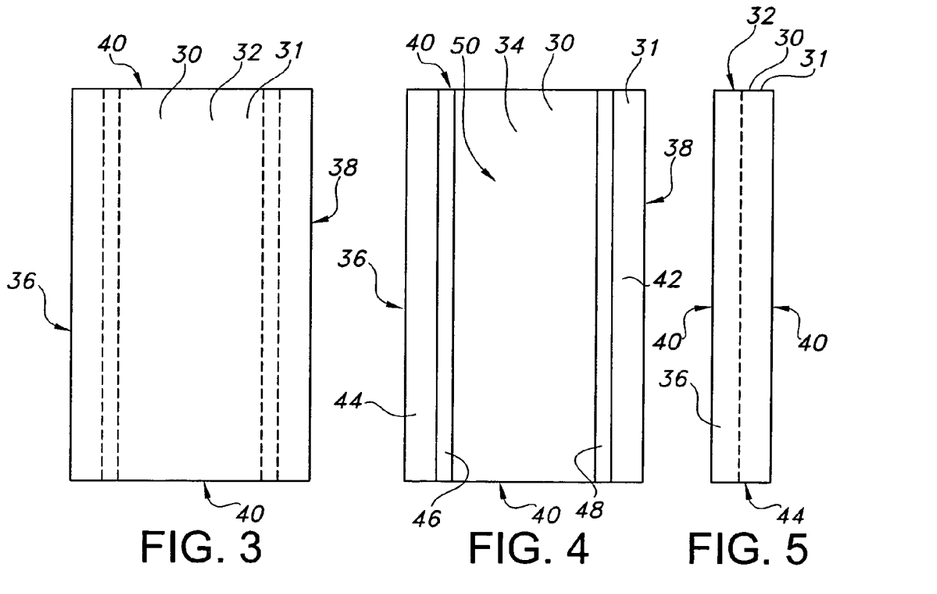
FIG. 3 shows a top plan view of the module of the first embodiment.
FIG. 4 shows a bottom plan view of the module of the first embodiment.
FIG. 5 shows a left side elevational view of the module of the first embodiment.

FIGS. 1-3 show a first embodiment of the invention for a hingeless belt 20. As shown in FIG. 1, the hingeless belt 20 comprises modules 30, and each module 30 has a body 31. The modules 30 have a generally C-shaped cross section. Each module 30 has a load side 32 and an opposed recessed module surface 34, opposed leading and trailing sides 36, 38, respectively, opposed outer sides commonly designated 40. The module 30 also has spaced apart first and second bases 42, 44, respectively. In one of the preferred embodiments, the leading side 36 is planar and perpendicular to the second base 44 and load side 32, and the trailing side 38 is planar and perpendicular to the first base 42 and load side 32. As shown in FIGS. 2 and 4, each module has a first drive surface 46 and a second drive surface 48. The recessed module surface 34 extends from the first drive surface 46 to the second drive surface 48. Defined between the first and second drive surfaces 46, 48, respectively, and the recessed module surface 34 is a sprocket recess or recess 50. The first and second drive sides 46, 48, respectively, are sloped such that the sprocket recess 50 narrows as it approaches the load side 32 of the module 30. The module 30 comprises a hard thermoplastic material including polypropylene, polyacetal, polyethylene, polyamides or the like. These materials are well known to those having ordinary skill in the art. The module can also comprise other moldable materials well known to those having ordinary skill in the art.

As shown in FIGS. 1 and 2, the hingeless belt 20 further comprises elastic joining members or joining members 52 (also referred to herein as connecting members). Each joining member 52 has a generally rectangular box-like shape, and has opposed first and second joining sides 54, 56, respectively, a joining member load side 58 and an opposed joining member base side 60. The joining member 52 also has opposed outer sides commonly designated 62. The joining member 52 comprises a thermoplastic elastomer such as thermoplastic polyurethanes and thermoplastic elastomers. The joining member 52 can also comprise other suitable elastomers well known to those having ordinary skill in the art.

As shown in FIGS. 1 and 2, in one of the preferred embodiments positioned between each joining member 52 and each module 30 is a layer 64. In one of the preferred embodiments the layer is an adhesive layer 66. The layer 64 connects or joins the lead side 36 of one module 30 to the first joining side 54 of the joining member 52, and another layer 64 connects or joins the second joining side 56 of the joining member 52 to the trailing side 38 of the adjacent module 30. In other preferred embodiments, the lead side 36 of one module 30 is joined to the first side 54 of the joining member 52, and the second joining side 56 of the joining member 52 is joined to the trailing side 38 of the adjacent module 30 with a means for joining, for example, a weld or a thermal bonding process. Welds and thermal bonding processes are well known to those having ordinary skill in the art.

In another preferred embodiment the layer 64 is a tie layer 68 (also referred to herein as foil or foil layer). The tie layer 68 has an irregular surface that aids in a strong mechanical lock, because the molten material from which the joining member 52 and module 30 are made can flow into these interstitial spaces and voids. The leading and trailing sides 36, 38, and first and second joining member sides 54, 46, respectively, are suitable for the application of the tie layer 68. The use of the tie layer 68 thus produces a very strong connection between the modules 30 and joining members 52. The hingeless belt 20 shown in FIG. 1 is formed by using the layer 64 to connect adjacent modules 30 and joining members 52 as will be described in greater detail below. As shown in FIG. 1, the hingeless belt 20 does not have any spaces or gaps between the modules 30 and joining members 52 which advantageously prevents the accumulation of undesirable debris between the modules and also advantageously provides for an easy to clean modular belt 20. In addition, because the modules 30 comprise a hard material they can advantageously withstand cutting and impacts.

Figure 6:
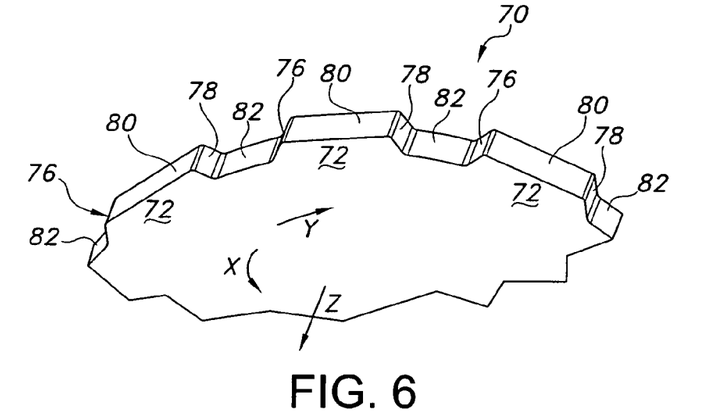
FIG. 6 shows a perspective view, partly in broken lines, of a sprocket wheel.

As shown in FIG. 6, the hingeless belt 20 described above is looped around a drive wheel or sprocket wheel 70 having spaced apart teeth or sprockets 72 and an idler wheel (not shown). As indicated by arrows X and Y in FIG. 6, the sprocket wheel 70 is rotated about a central axis designated Z in a counterclockwise or counterclockwise direction by, for example, a motor (not shown). The sprockets 72 are sized to be received in the recesses 50 in the modules 30 and each sprocket 70 has a first contact surface 76, a second contact surface 78 and a elevated surface 80 that extends from the first 76 to the second contact surface 78. In addition, the first and second contact surfaces 76, 78, respectively, are sloped such that the sprockets narrow as they approach the elevated surface 80. The sprocket wheel 70 has peripheral surfaces commonly designated 82 that extend between the sprockets 72.

Figure 7:
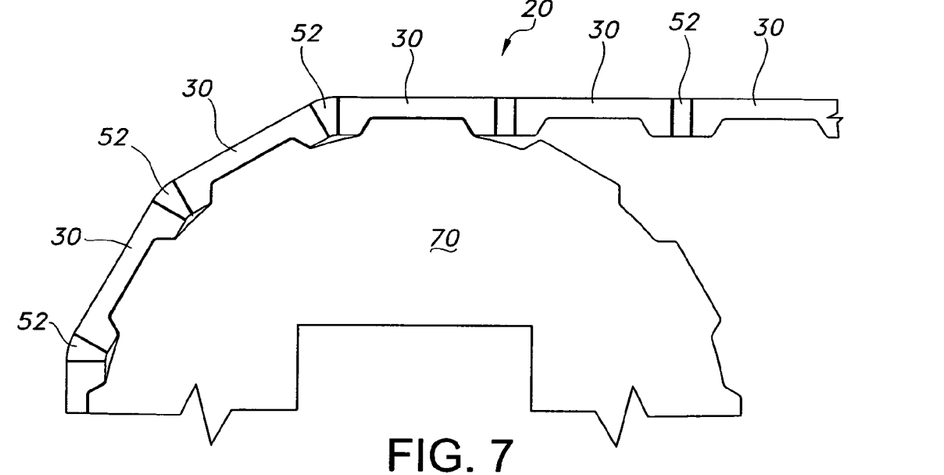
FIG. 7 shows a front elevational view of a sprocket wheel driving the hingeless belt according to the first embodiment of the invention.

Reference is now made to FIG. 7 which shows the modular belt 30 looped around the sprocket wheel 70. As shown, the teeth 72 are received in the recesses 50 in the modules 30 such that the first drive surfaces 46 of the modules 30 contact the first contact surfaces 76 of the teeth 72, and the second contact surfaces 78 of the teeth 72 contact the second drive surfaces 48 of the module 30, and the elevated surfaces 80 of the teeth 72 contact the recessed module surface 34 of the modules 30. In addition, because the joining member 52 is elastic as described above, it can be advantageously deformed as is driven around the sprocket wheel 70. In particular, as shown in FIG. 7, the joining member load sides 58 advantageously flex outwardly and elongate as the hingeless belt 20 is driven around the sprocket wheel 70, and the joining member base sides 60 advantageously compress and flex inwardly as the hingeless belt 20 is driven around the sprocket wheel 70. Thus, the joining members 52 allows the hingeless belt 20 to deform and bend around the drive sprocket wheel 70. The joining members 52 and modules 30 advantageously do not separate because they are strongly connected as described above.

Figure 8:
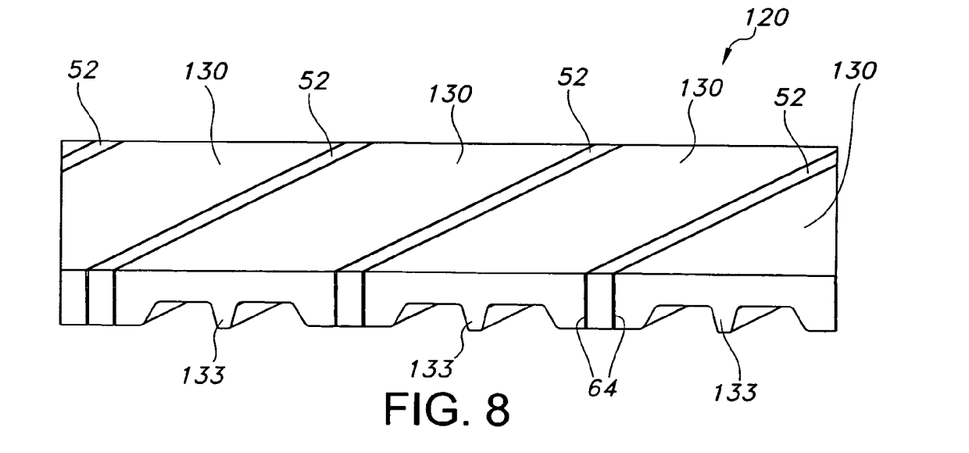
FIG. 8 shows a perspective view of a section of a hingeless belt having modules with impact bars and joining members according to a second embodiment of the invention.
Figure 9:
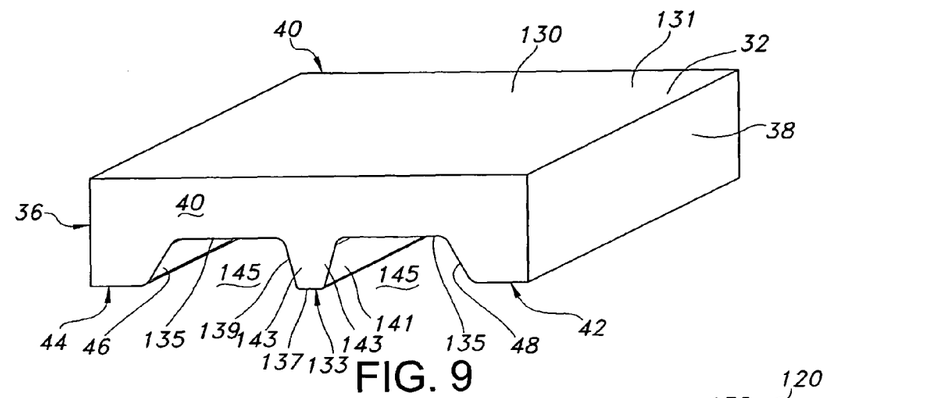
FIG. 9 shows a perspective view of the impact bar module of the second embodiment of the invention.
Figure 10:
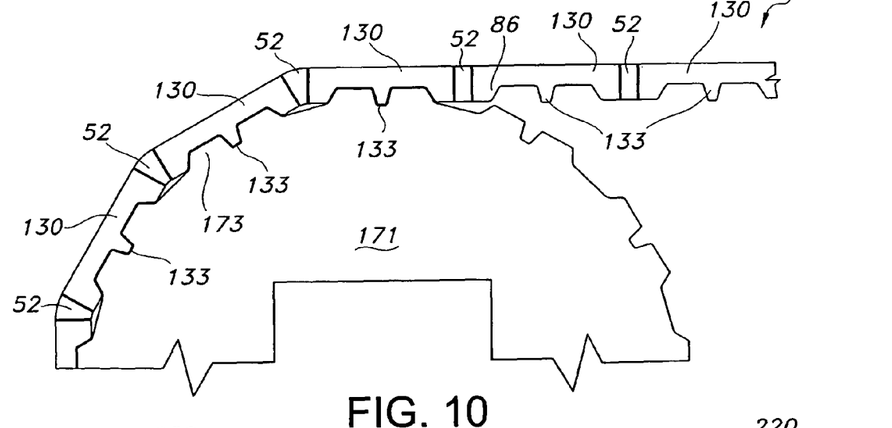
FIG. 10 shows a front elevational view of a sprocket wheel driving the second embodiment of the hingeless belt according to the second embodiment of the invention.

FIGS. 8-10 show a second embodiment of a hingeless belt 120 that has modules 130 having module bodies 131 with transverse ribs 133. Each module 130 has a load side 32, a pair of recessed module surfaces 135, a leading side 36 and an opposed trailing side 38, and opposed outer sides 40. The module 130 also has a first base 42 and a second base 44. As shown in FIG. 8, the transverse rib 133 has a transverse rib base 137, a first transverse rib drive side 139, a second transverse rib drive side 141 and opposed transverse rib outer sides 143 that are co-planer with the opposed outer sides 40. The first transverse rib drive side 139 extends from one of the recessed module surfaces 135 to the transverse rib base 137, and the second transverse rib drive side 141 extends from the other recessed module surface 135 to the transverse rib base 137. Recesses 145 are defined between the second drive side 48, one of the recessed module surfaces 135 and the first transverse rib drive side 139, and between the second drive side 38, the other recessed module surface 135 and the second transverse rib drive surface 141. As shown in FIG. 9, the transverse rib 133 engages the sprockets 173 of sprocket wheel 171 in a manner similar to that described in connection with the first embodiment. The transverse ribs 133 advantageously provide for increased module stability and improved sprocket drive transmission as compared to that of, for example, the first embodiment described above. As shown in FIG. 8, the modules 130 are connected to one another with joining members 52 and layers 64 in the same manner as described in connection with the first embodiment.

Figure 11:
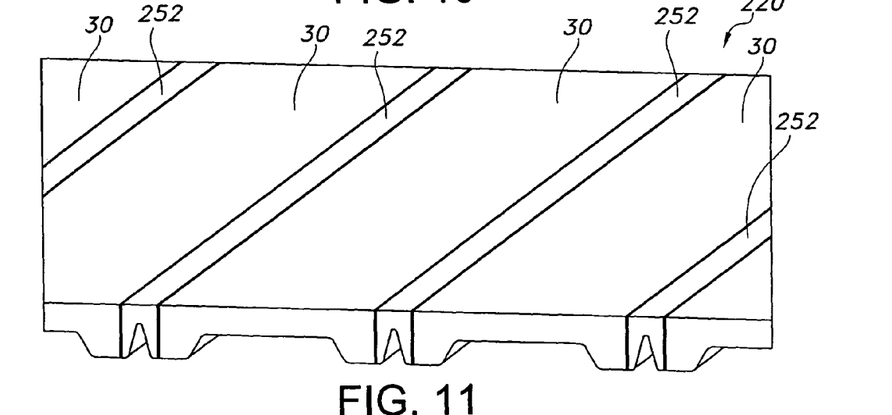
FIG. 11 shows a perspective view of a section of hingeless belt having grooved joining members according to a third embodiment of the invention.
Figure 12:
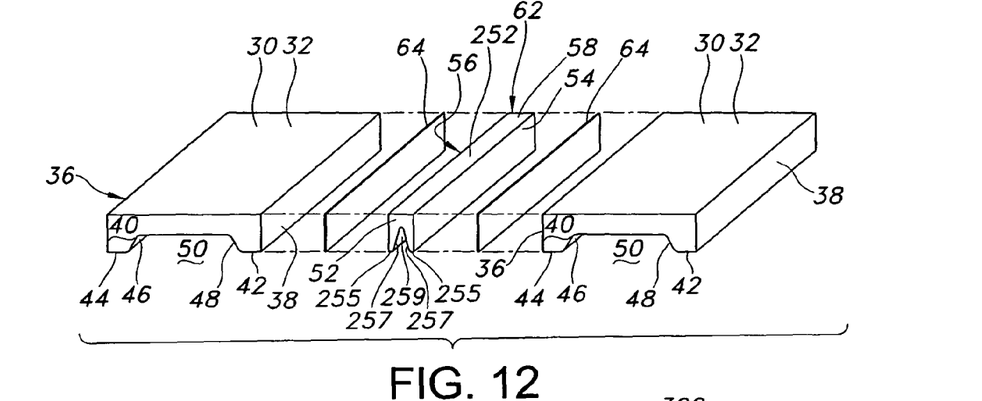
FIG. 12 is an exploded view of a section of the modular belt having grooved joining members according to the third embodiment of the invention.

FIGS. 11 and 12 show a third embodiment of a hingeless belt 220 having modules 30 as described above in connection with the first embodiment, and joining members 252 having grooves or recesses 259. The joining member 252 comprises the same materials as described above in connection with the first embodiment. The joining member 252 has a generally rectangular box-like shape, opposed first and second joining sides 54, 56, respectively, and a joining member load side 58. There are bases 255 opposite the load side 58. The joining member 252 also has opposed outer sides commonly designated 52. The groove or recess 259 in the joining member 252 extends from one of the opposed outer sides 52 to the other opposed outer side 52, and from the bases 255 into the joining member 252. There is a pair of internal joining member surfaces commonly designated 257 that face one another and that slope in a direction toward one another as they approach the joining member load side 58, and that define the groove or recess 259. The groove or recess 259 extends in a direction toward the joining member 252 load side 58 and has a V-shaped cross section. The groove 259 advantageously decreases the bending stiffness of the joining member 252 allowing it to compress such that the two internal joining member surfaces 257 are capable of moving toward one another when the hingeless belt 220 bends around the sprocket wheel 70 in the manner described above. The joining members 252 are connected to the modules 30 with the layer 64 in the same manner as described above in connection with the first embodiment.

Figure 13:
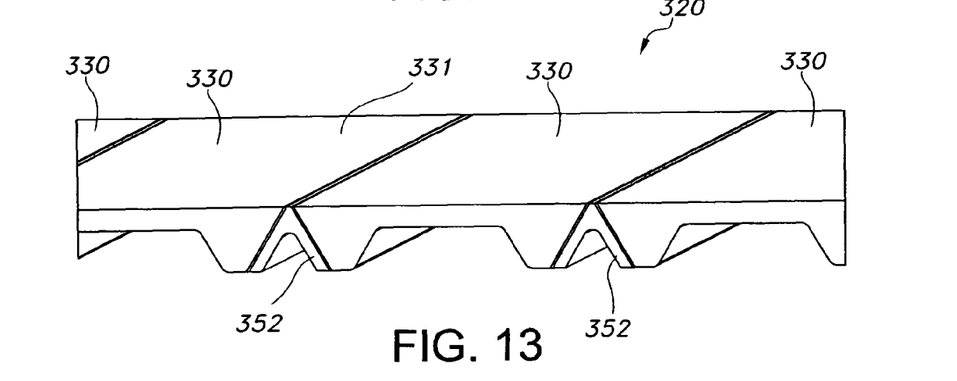
FIG. 13 shows a perspective view of a section of a hingeless belt having angled modules and angled connecting members according to a fourth embodiment of the invention.
Figure 14:
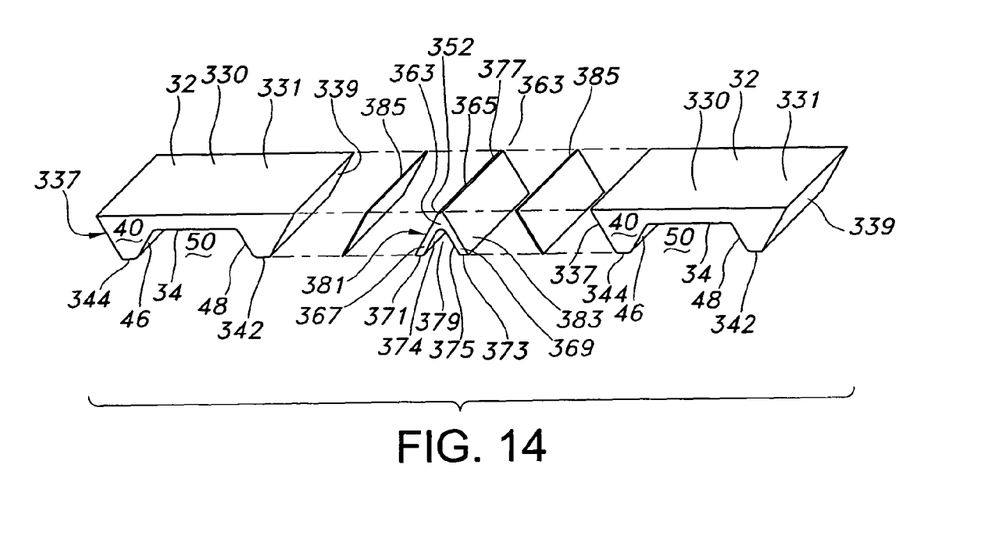
FIG. 14 shows an exploded view of a section of the hingeless belt having angled modules and angled joining members according to the forth embodiment of the invention.

FIGS. 13 and 14 show a fourth embodiment of a hingeless belt 320 comprising modules 330 having module bodies 331. The module 330 has a load side 32 for supporting a load, a recessed module surface 34, an angled leading side 337 and an angled trailing side 339. The module 330 also has opposed outer sides 40. The module 330 has a first base 42 and a second base 44 and a first drive surface 46 and a second drive surface 48. The angled leading side 337 slopes inwardly in a direction toward the first base surface 42. Similarly, the angled trailing side 339 slopes inwardly in a direction toward the second base surface 44. As shown in FIG. 13, the recessed module surface 34 extends between the first drive surface 46 and the second drive surface 48. Defined between the first and second drive surfaces 46, 48, respectively, and recess module surface 34 is a recess 50 for receiving a sprocket 70 therein in the manner described above in connection with the first embodiment.

There is a joining member 352 that has opposed outer sides commonly designated 363 and a load joining member side 365. The joining member 352 has spaced apart first and second legs 367, 369, respectively, having first and second leg bases 371, 373, respectively. In addition, the first and second legs 367, 369, respectively, have first and second internal leg surfaces 374, 375, respectively. The first and second legs 371, 373, respectively, extend from and slope in a direction toward a bendable portion 377 that is proximal the load side 365. The joining member 352 has a groove or recess 379 that extends from the first internal leg surface 373 to the second internal leg surface 375, and from one of the opposed outer sides 363 to the other opposed outer side 363. Thus, the joining member 352 has an inverted V-shape, as shown in FIGS. 13 and 14. As shown, the recess 379 narrows as it approaches the bending portion 377. The joining member 352 also has angled first and second outer joining sides 381, 383, respectively, which slope outward as they extend from the joining portion 377 and approach the first and second leg bases 371, 371, respectively.

Layers 385 that have a length equal to a length of the angled first and second outer joining sides 381, 383, respectively, join or connect the joining member 352 and modules 330 in the manner described above in connection with the first embodiment. The layers 385 are made of the same materials as described in connection with the first embodiment. In addition, because the angled leading side 337 and the angled trailing side 339 of the module 330 are sloped they advantageously have an increased surface area that makes contact with the layers 385, as compared to the vertical leading and trailing surfaces 36, 38, respectively, described in connection with the first embodiment. This increase in surface area advantageously enhances the connection between the modules 330 and joining members 352. In addition, the shape of the joining member 352 advantageously decreases the stiffness of the modular belt 320, and because the bending portion 377 has a small cross section it advantageously increases elasticity of the joining member 352 and further reduces the bending stiffness of the modular belt 320. In addition, the load side 365 has decreased surface area as compared to the joining member load side 58 in the first embodiment, which advantageously decreases the area of exposure of the modular belt 320 to cuts and deleterious materials. Thus, it is desirable to keep the surface area of the joining member 352 to a minimum. In addition, because the angled joining member 352 advantageously has decreased bending stiffness, that it can readily bend around a sprocket wheel.

Figure 15:
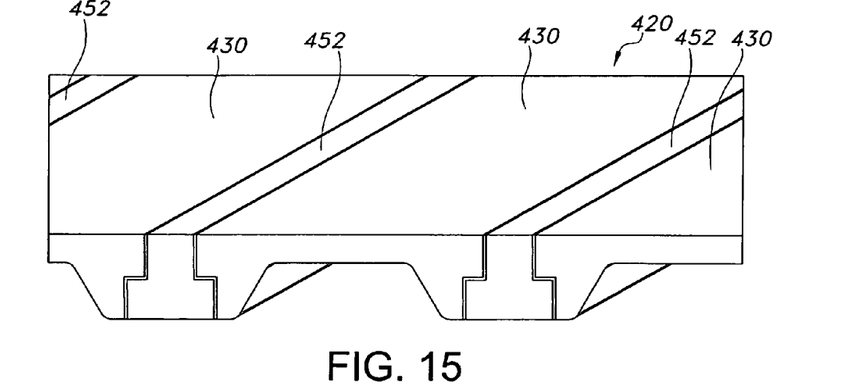
FIG. 15 shows a perspective view of a section of a hingeless belt having stepped modules and stepped connecting members according to a fifth embodiment of the invention.
Figure 16:
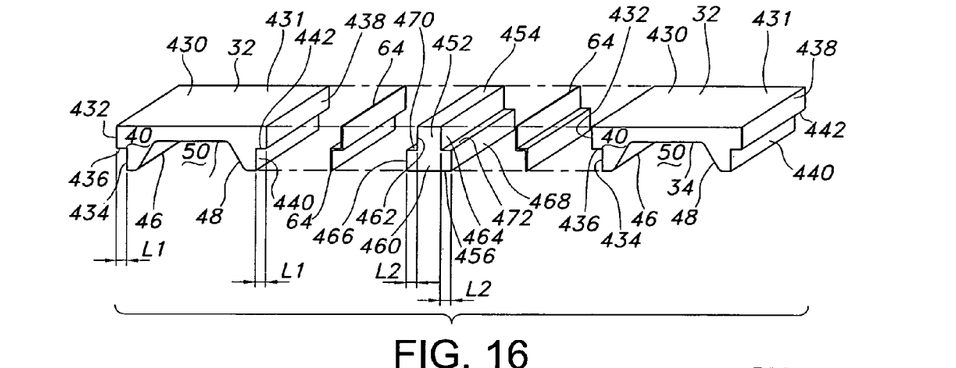
FIG. 16 shows an exploded view of a section of the hingeless belt having stepped modules and stepped joining members according to the fifth embodiment of the invention.

FIGS. 15 and 16 show a fifth embodiment of a hingeless belt 420 having modules 430 having module bodies 431. Each module 430 has a load surface 32, a recessed module surface 34, and opposed outer sides 40. The first and second drive surfaces 46, 48, respectively, and recessed module surface 34 define a sprocket recess 50. The module 430 has a first leading wall 432 and a recessed second leading wall 434 that is recessed relative to the first leading wall 432 as shown in FIGS. 15 and 16. A leading contact wall 436 extends from the first leading wall 432 to the recessed leading wall 434. The module 430 also has a first trailing wall 438 and a recessed second trailing wall 440 that is recessed relative to the first trailing wall 438. A trailing contact wall 442 extends from the first trailing wall 438 to the recessed second trailing wall 440. The leading contact wall 436 and trailing contact wall 442 have the same length which is designated L1 in FIG. 16.

As shown in FIG. 16, there is a joining member 452 that has a joining member load side 454 and an opposed joining member base 456. The joining member 452 has opposed outer joining member walls 460, opposed first and second joining member walls 462, 464, respectively, and opposed third and fourth joining member walls 466, 468, respectively. A first joining member contact wall 470 extends from the first joining wall 462 to the third joining member wall 466, and a second joining member contact wall 472 extends from the third joining member wall 464 to the fourth joining member wall 468. Each of the first joining member contact wall 470 and second joining member contact wall 472 has a length commonly designated L2 in FIG. 16. A layer 64 is positioned between the joining member 452 and modules 430. Thus, when modules 430 and joining member 452 are made into the hingeless belt 420 shown in FIG. 15, the layer 64 is positioned between the second trailing wall 438 and the first joining member wall 462, the recessed second trailing wall 440 and the third joining member wall 466, and the trailing contact wall 442 and the first joining member contact wall 470, with the layer 64 positioned therebetween. Similarly, when modules 430 and joining member 452 are made into the hingeless belt 420, the layer 64 is positioned between the first leading wall 432 and second joining member wall 464, the recessed leading wall 434 and the fourth joining member wall 468, and the leading contact wall 436 and the second joining member contact wall 472, with the layer 64 positioned therebetween. Thus, there is advantageously provided increased contact area between the joining members 452 and modules 439 which enhances the connection that they make with one another.

Figure 17:
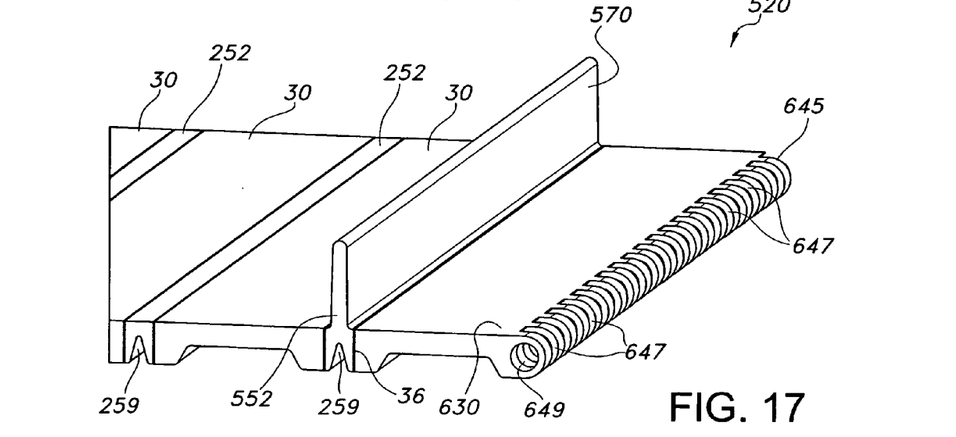
FIG. 17 shows a perspective view of section of a second of a hingeless belt having a modules, a link modules and a grooved flight joining member according to a sixth embodiment of the invention.
Figure 18:
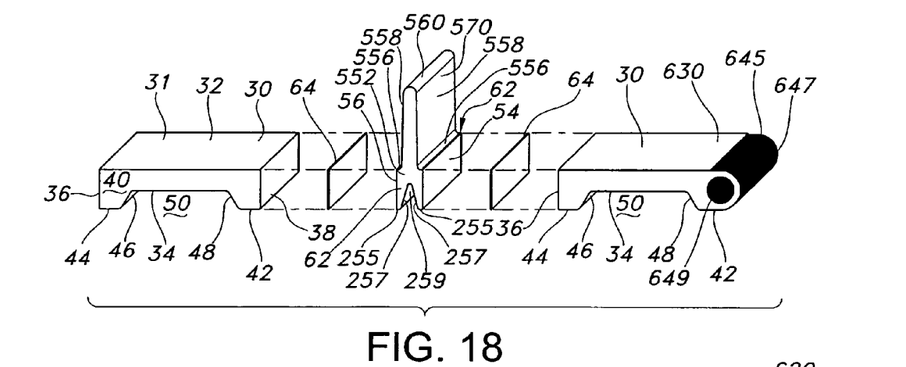
FIG. 18 shows an exploded view of the sixth embodiment of the hingeless belt showing the module, link module and grooved flight joining member according to the sixth embodiment of the invention.

FIGS. 17 and 18 show a sixth embodiment of a hingeless belt 520 that has modules 30, and each module 30 has a body 31, as described in connection with the first embodiment. As shown in FIG. 17, some of the modules 30 are connected to one another with joining members 252 as shown in FIG. 10 and fully described above in connection with the third embodiment. In this embodiment there is a flight joining member 552 that joins module 30 to a first link module 630 which will be described presently. The flight joining member 552 is the same as the joining member 252 described above in connection with the third embodiment to the extend that it has opposed first and second joining sides 54, 56, respectively, bases 255, opposed outer sides 62, and facing internal joining member surfaces commonly designated 257 that slope in a direction toward one another to define the groove or recess 259. In addition, the flight joining member 552 has spaced apart flight sides 556 opposite the bases 255, and a flight 570 that extends from the flight joining member 552 such that one of the flight sides 556 is on each side thereof. The flight 570 has opposed flight surfaces 558 that meet at an end surface 560. The flight has opposed flight outer sides 562 that are coplanar with the opposed outer sides 62. The use of flights in conveyor belt systems is well known to those having ordinary skill in the art. In other embodiments, the flight 570 can have other shapes, can be at an angle to the load side 32 of the modules 30, and the flight 570 can have any desired opening and can be reinforced. In addition, FIGS. 17 and 18 also shows the flight joining member 552 joining the module 30 and the first link module 630, to be described in detail presently, with layers 64. In another embodiment, the flight joining member 552 can be made without the groove 259.

Figure 19:
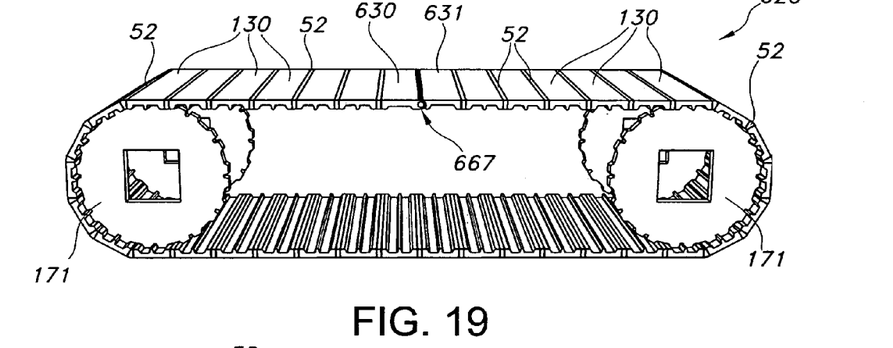
FIG. 19 shows a perspective view of a hingeless belt having link modules and impact bar modules according to a seventh embodiment of the invention.
Figure 20:
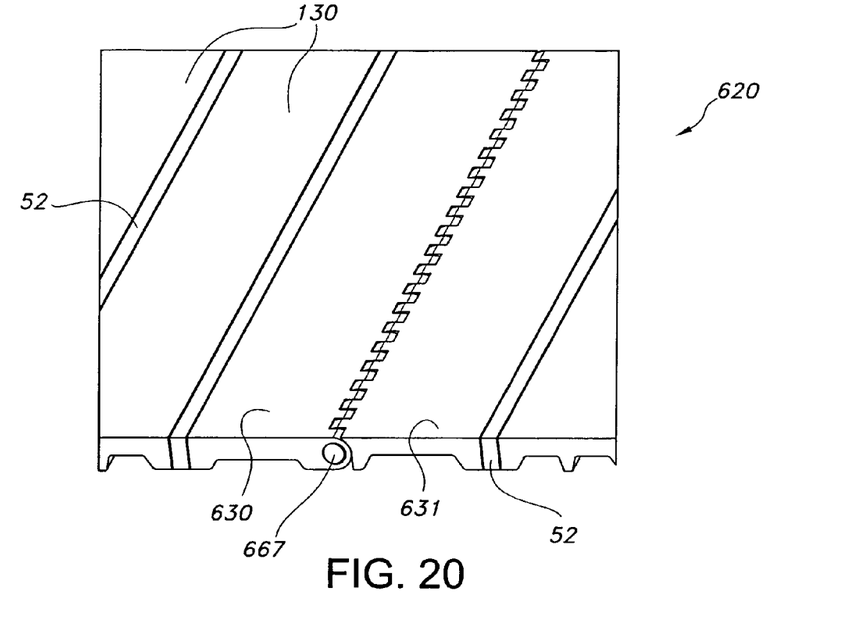
FIG. 20 shows a top perspective view of the seventh embodiment of the hingeless belt according to the seventh embodiment of the invention.
Figure 21:
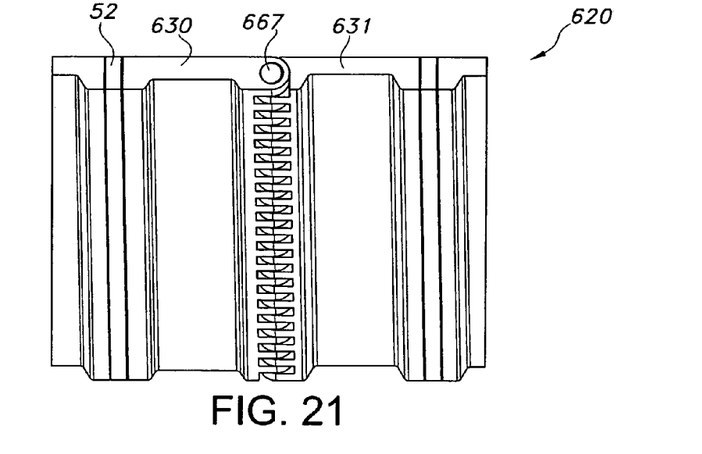
FIG. 21 shows a bottom perspective view of the hingeless belt according to the seventh embodiment of the invention.
Figure 22:
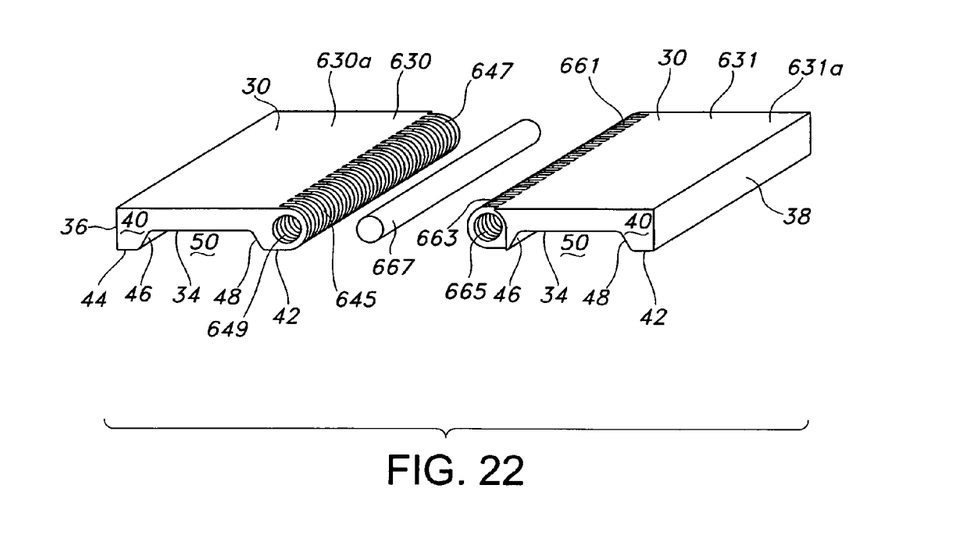
FIG. 22 shows an exploded view of the link modules and pivot according to the seventh embodiment of the invention.

FIGS. 19-22 show a seventh embodiment of a hingeless belt 620 having a first link module 630 having a first link module body 630a, and second link module 631 having a second link module body 631a. The first and second link modules 630, 630a, respectively, are part of a hingless modular belt 120 having modules 130 that have transverse ribs 133, as described in connection with the second embodiment, shown in FIGS. 19-21. As shown in FIG. 22, the first link module 630 has the load side 32 for supporting a load, recessed module surface 34 and opposed outer sides 40. The first link module 630 also has first and second bases 42, 44, respectively, and first and second drive surfaces 46, 48, respectively, with the recessed module surface 34 extending between the first and second drive surfaces 46, 48, respectively. The first link module 630 also has a leading side 36 and an opposed first link end 645. The first link end 645 has first links 647 and each of the first links 647 has a first link opening 649. The first links 647 are spaced apart, as shown in FIGS. 17, 18 and 22. The second link module 631 has first and second bases 42, 44, respectively, and first and second drive surfaces 46, 48, respectively, with the recessed module surface 34 extending between the first and second drive surfaces 46, 48, respectively. The second link module 631 also has a trailing side 38, a first base 42 and a second base 44. Defined between the first and second drive surfaces 46, 48, respectively, and the recessed module surface 34 is recess 50. Opposite the trailing side 38 is a second link end 661. The second link end 661 has second links 663 and each of the second links 663 has a second link opening 665. The second links 661 are spaced apart as shown in FIG. 22. A pivot rod 667 is provided. The first and second link modules 630, 631, respectively, are moved together such that the first and second links 647, 663, respectively, mesh or intercalate, and the first link openings 649 and second link openings 665 align. The pivot rod 667 is positioned in the first link openings 647 and second link openings 665 and a head is formed on the pivot rod 661 to hold the first link module 630 and the second link module 631 together. Forming heads on pivot rods well known to those having ordinary skill in the art. The first and second link modules 630, 631, respectively, can be used in the to hold a section of hingeless modular conveyor belt together, as shown in FIGS. 19-21.

Figure 23:
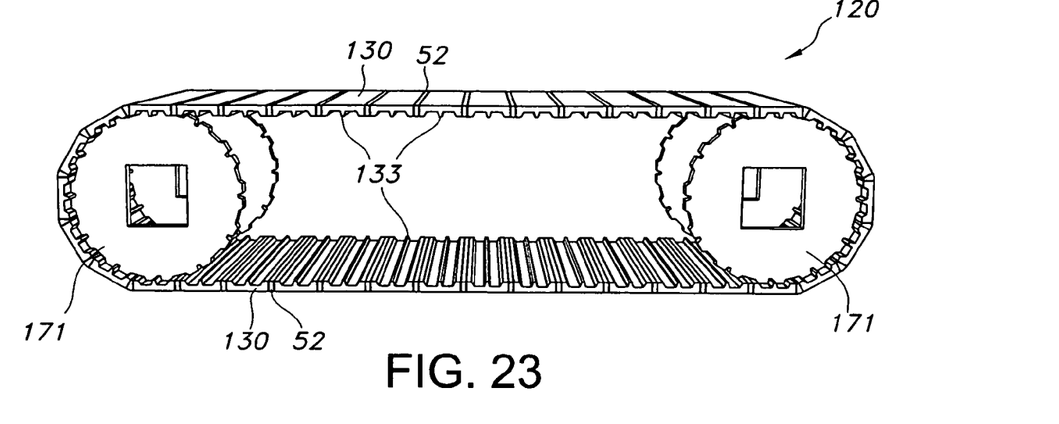
FIG. 23 shows a perspective view of a hingeless belt having impact bar modules and joining members wherein the joining member material is injected between the modules at the ends of a section of belt form the hingeless belt according to an eighth embodiment of the invention.

FIG. 23 shows an eighth embodiment of a hingeless belt 120 formed as a one piece belt. The hingeless belt 120 has modules 130 that have transverse ribs 133, as described in connection with the second embodiment. The one piece hingeless belt 120 provides for modular belt that is easy to clean. The hingeless belt 120 is made by inserting the ends of a section of the hingeless belt 120 into the cavities of a molding machine, and injecting the thermoplastic material to form the module 30, joining the layers 64 to the modules 130, and injecting the elastomer from which the joining member 52 is made. Such a process will be described presently.

FIGS. 24-27 show a ninth embodiment of a hingeless belt 820 that has modules 830 having bodies 831. The module 830 has the load side 32, recessed module surface 34, opposed outer sides commonly designated 840, a first base 842 and a second base 844, a slotted leading side 836 and a slotted trailing side 838, and first and second drive surfaces 46, 48, respectively. The slotted leading side 836 slopes inwardly in a direction toward the second base 844. Similarly, the slotted trailing side 838 slopes inwardly in a direction toward the first base surface 842. In another embodiment the slotted leading and trailing sides 836, 838, respectively are perpendicular to the load side 32. Defined between the first and second drive surfaces 46, 48, respectively, and recess module surface 34 is a recess 50 for receiving a sprocket 70 therein.

Figure 24:
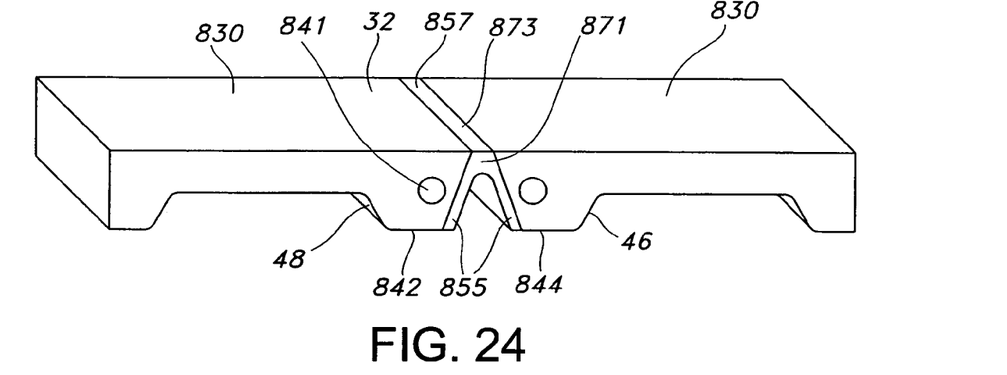
FIG. 24 shows a perspective view of a section of a hingeless belt having slotted modules according to a ninth embodiment of the invention.
Figure 25:
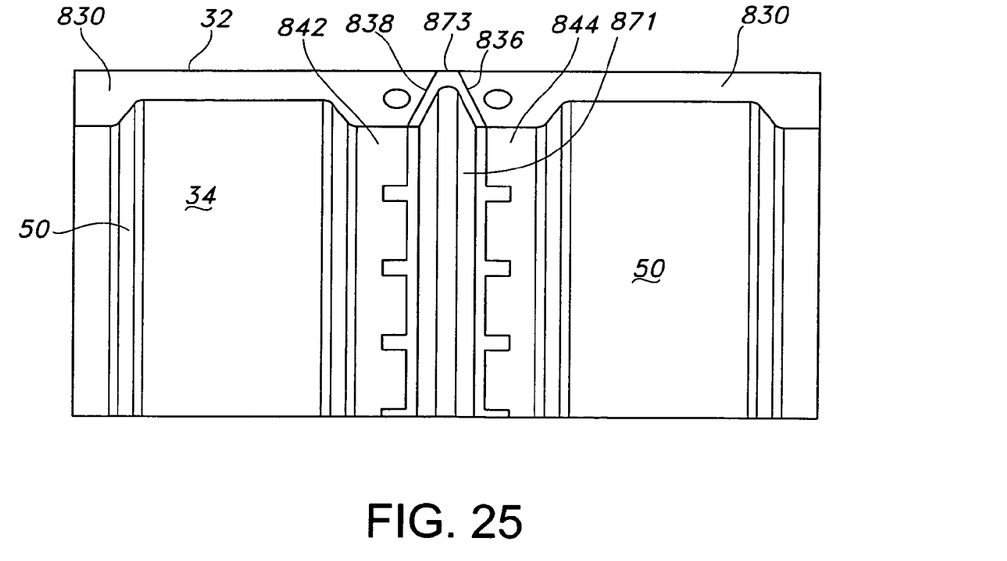
FIG. 25 shows a bottom perspective of the hingeless belt according to the ninth embodiment of the invention.
Figure 26:
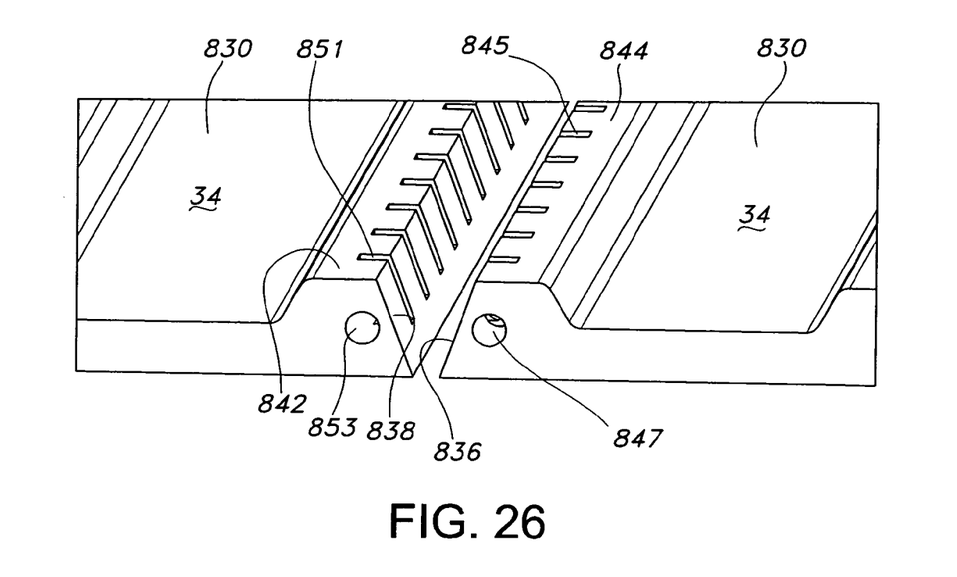
FIG. 26 shows a bottom perspective view of a section of the hingeless belt with slots and openings and openings for receiving elastic joining material according to the ninth embodiment of the invention.
Figure 27:
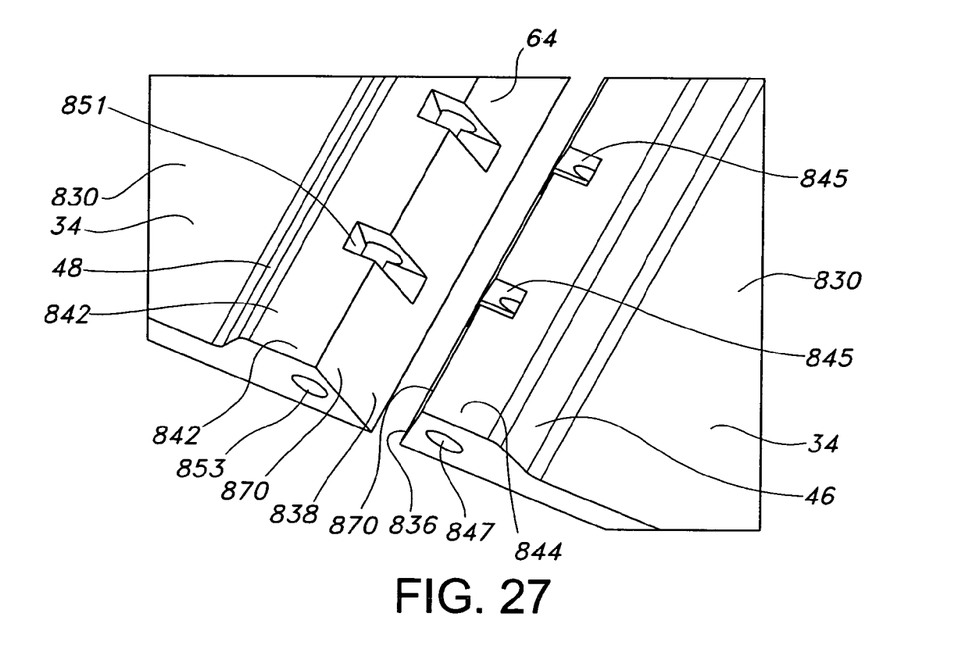
FIG. 27 shows an enlarged portion of FIG. 26 showing the slots and openings according to the ninth embodiment of the invention.

The hingeless belt 820 is comprised of modules 830 that are connected to adjacent modules 830. In particular, each of the modules 830 have at least one first slot 845, and can have a plurality of first slots 845 as shown in FIGS. 26 and 27. The first slots 845 extend from the slotted leading side 836 and the second base 844 into the module 830. The module 830 also has a first opening 847 that extends from one opposed outer side 840 to the other opposed outer side 840. The first opening 847 extends through the module 830 to the first slots 845 such that the first opening 847 and first slots 845 are in communication with one another. Similarly, each of the modules 830 has at least one second slot 851, and can have a plurality of second slots 851 as shown in FIGS. 26 and 27. The second slots 851 extend from the slotted trailing side 838 and the first base 842 into the module 830. A second opening 853 extends from one opposed end surface 840 to the other opposed end surface 840. The second opening 853 extends through the module 830 to the second slots 851 such that the second opening 853 and second slots 851 are in communication with one another, as best shown in FIG. 27. A layer 64 is applied to facing portions, commonly designated 870, of the slotted leading side 836 and slotted trailing side 838. As shown in FIG. 25, molded elastic joining material 871 fills the first and second slots 845, 851, respectively, and the first and second openings 847, 853, respectively, advantageously making a virtually perfect mechanical connection between the module 830 and an adjacent module 830. There is a molded load surface 873 that advantageously has decreased surface area thus minimizing the amount of exposure to cuts and impacts. The molded elastic joining material 871 has an inverted V-shape, as shown in FIG. 24, which advantageously allows the hingeless belt 820 to be flexible.

Figure 28:
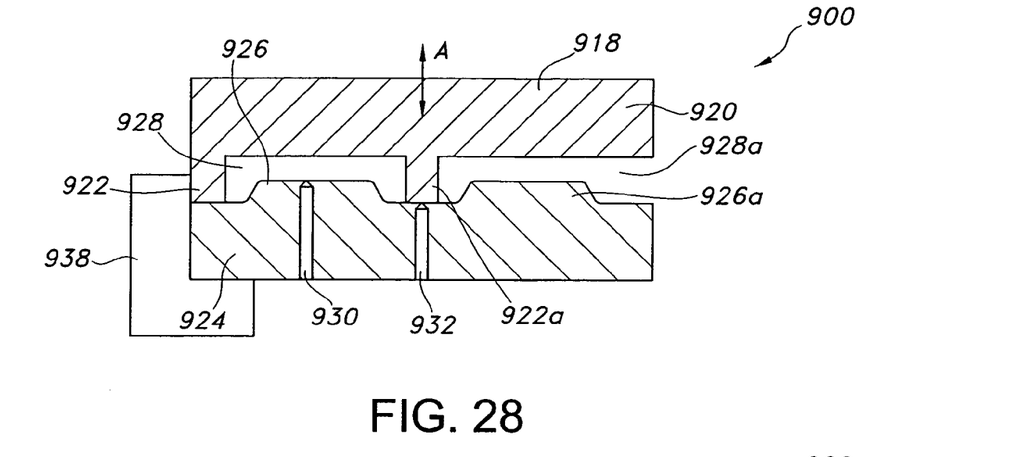
FIG. 28 shows a sectional view of the mold used for making the modular belt according to the first embodiment of the invention.

As shown in FIGS. 28-33, the above-described modular belts are preferably made in a molding machine 900 (also referred to herein as apparatus). In particular, FIGS. 28-33 show the modules 30 described above in connection with the first embodiment 30 being molded and joined to one another in the molding machine 900. The molding machine 900 includes a mold 918. The mold 918 has a first mold member 920 having first and second spacing walls 922, 922a, respectively, and a facing second mold member 924 having first and second protrusions 926, 926a, respectively. As shown in FIG. 28, there is a first cavity 928 defined by the first spacing wall 922, first mold member 920, second mold member 924 and first protrusion 926. A second cavity 928a is defined by the second spacing wall 922a, first mold member 920, second mold member 924 and second protrusion 926a. The first and second cavities 928, 928a, respectively, have the shape of the module 30. The second mold member 924 has a first fill passage 930 that is connected to a thermoplastic material reservoir 934. The second mold member 924 is also has a second fill passage 932 connected to an elastic joining member reservoir 936.

Figure 29:
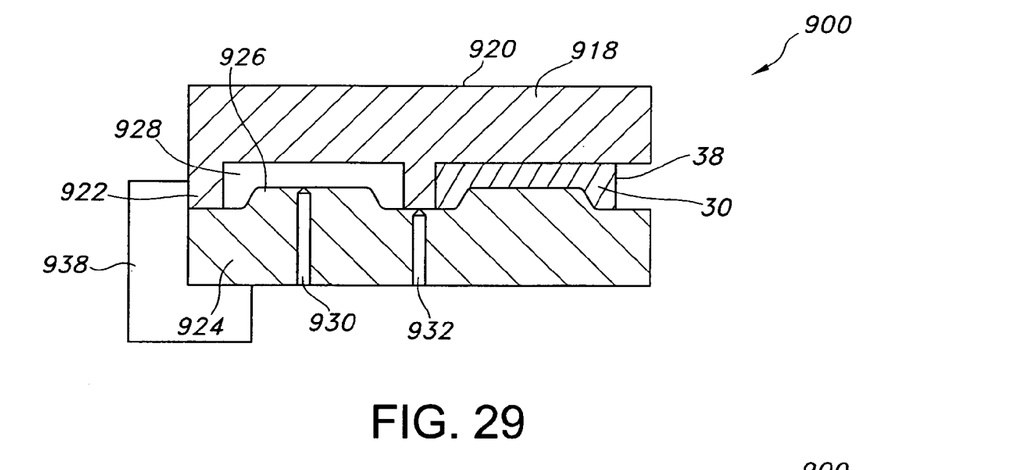
FIG. 29 shows a sectional view of the mold used for making the modular belt wherein a module is placed in one of the mold cavities according to the first embodiment of the invention.
Figure 30:
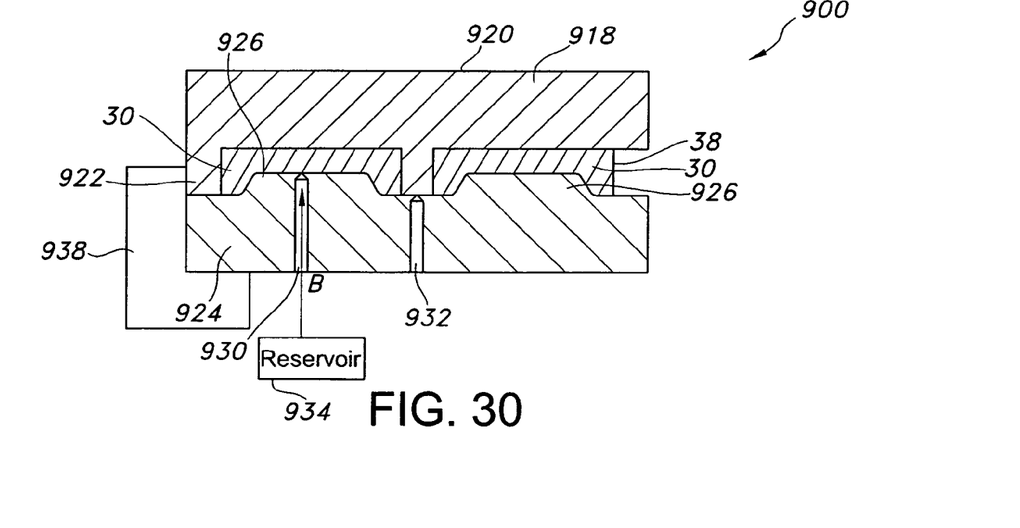
FIG. 30 shows a sectional view of the mold used for making the modular belt wherein the material from which the module is made is injected into the other mold cavity according to the first embodiment of the invention.
Figure 31:
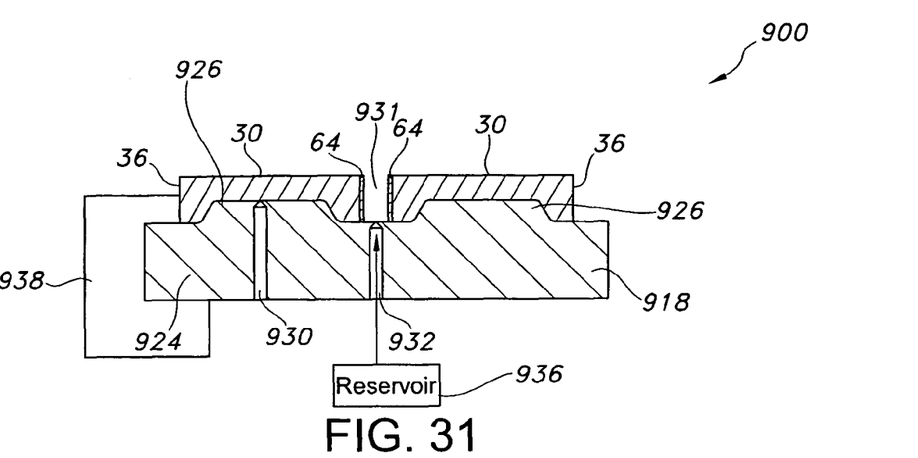
FIG. 31 shows a sectional view of the mold used for making the modular belt wherein the mold is opened and a layer is applied to the modules in the mold according to the first embodiment of the invention.

As shown in FIG. 28, the molding process begins with opening the mold 918 such that the first mold member 920 moves in a direction away from the second mold member 924, as indicated by arrow A. The opening and closing of the mold is carried out be a means for opening and closing the mold. Such means for opening and closing the mold include hydraulic systems, indicated generally by reference number 938, and hydraulic systems are well known to those having ordinary skill in the art. There are other means for opening and closing the mold as is well known to those having ordinary skill in the art. The next act is to insert an already made module 30 in the second cavity 928a, as shown in FIG. 29. This is followed by introducing or injecting the above-described thermoplastic material from which the module is made into the first cavity 928 through the first fill passage 930, as indicated by arrow B in FIG. 30. As shown in FIG. 31, after cooling the mold 918 is opened, and there is a space or gap 931 that extends from one module 30 to the other module 30. The layer 64 is applied to the leading and trailing surfaces 36, 38, respectively of the modules 30, as shown. The space 931 is narrower after the application of the layers 64.

Figure 32:
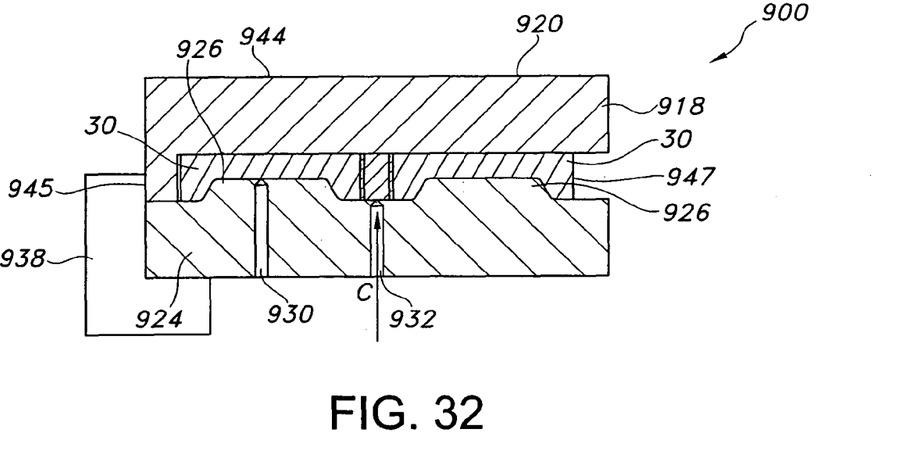
FIG. 32 shows a sectional view of the mold used for making the modular belt wherein the material from which the joining member is made is injected between the layers that are joined to the modules according to the first embodiment of the invention.

As shown in FIG. 32, the molding machine 900 also has a third mold member 944 that replaces the first mold member 920 in the next step of making the hingeless belt 20. In particular, the third mold member 944 faces the second mold member 924. The third mold member 944 has an outer wall 945, but does not have the above described second spacing wall 922a, as shown in FIG. 32. An elongate module cavity 947 is defined between the third mold member 944 and second mold member 924 and it accommodates two spaced apart modules 930, as shown in FIG. 32. The elongate module cavity 947 advantageously allows the elastic material from which the joining member 52 is made to be introduced or injected through the second fill passage 932, as indicated by arrow C in FIG. 32, into the space 931 after the third mold member 944 has been closed on the second mold member

Figure 33:
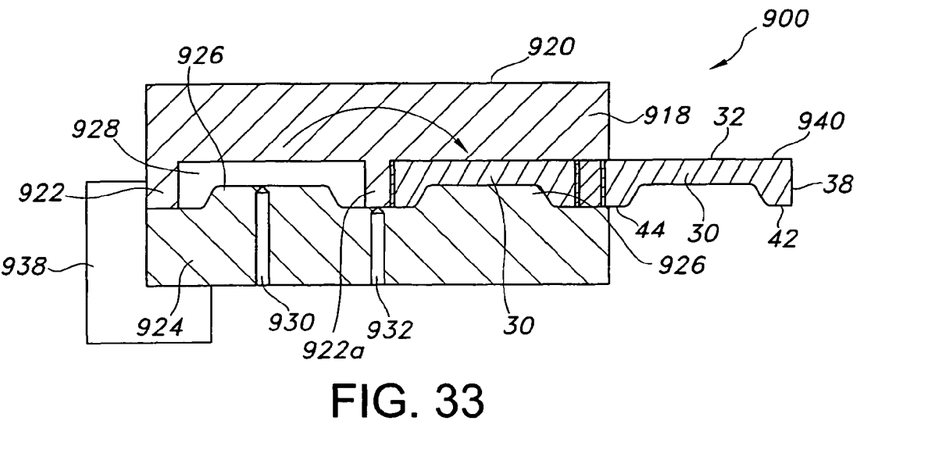
FIG. 33 shows a sectional view of the mold used for making the modular belt wherein joined modules are being moved out of the mold such that another module can be formed according to the first embodiment of the invention.

924. The elastic material from which the joining member 52 is made fills the space 931 and contacts and joins to the layers 64, such that after cooling, the modules 30 shown in FIG. 32 are joined to one another. Next, the mold 918 is opened, and the joined modules 30 are displaced such that the just formed module 30 is positioned in the second cavity 928*a*, as shown in FIG. 33. In this manner a section 946 of hingeless belt is 20 is formed. The above-described process is repeated and the first mold member 920 is closed on the second mold member 924 as shown in FIG. 29, and in this manner a section 946 of hingeless belt 20 having any desired length is formed. It will be readily apparent that the above described molding process can be used to form the other embodiments of the hingeless belt described herein.

The above described hingeless belts advantageously reduce the number of hinges to one, or to a minimum number for long belts. The invention also provides for hingeless belts that advantageously are easy to clean and use. In addition, the elimination of connection modules having hinges, or the reduction of such connection modules to a minimum, minimizes the number of gaps and openings in the belt, which advantageously increases the ease with which the hingeless belt 30 can be cleaned. In addition, the above-describe molding is advantageously accomplished by one machine 900. It is to be understood that the molding can also be accomplished on two molding machines, wherein the first molding machine forms the modules 30 as described above and the other molding machine (not shown) carries out the molding associated with the third mold member 440 as described above.

In addition, it is to be understood that the modules, for example modules 30, described herein can be formed by molding, extruding and cut to length and machining processes.

It will be appreciated by those skilled in the art that while a hingeless belt invention has been described above in connection with particular embodiments and examples, the invention is not necessarily so limited, and other embodiments, examples, uses, and modifications and departures from the described embodiments, examples, and uses may be made without departing from the hingeless belt of this invention. All of these embodiments are intended to be within the scope and spirit of the present hingeless belt invention.

What is claimed is:

1. A hingeless belt comprising:
   modules,
   layers, and
   joining members and wherein one of the layers connects one of the modules to the joining member and another layer connects another module to the joining member, wherein the joining member is fixedly attached between modules by molding the joining member between layers.

2. The hingeless module belt according to claim 1 wherein the joining member is made of an elastic material and the layer is an adhesive layer.

3. The hingeless belt according to claim 2 wherein the elastic material comprises an elastomer.

4. The hingeless belt according to claim 1 wherein the module comprises a hard plastic material.

5. The hingeless belt according to claim 1 wherein the hard plastic material is selected from the group comprising: polypropylene, polyacetal, polyethylene, and polyamide.

6. The hingeless belt according to claim 1 wherein the modules have transverse ribs.

7. The hingeless belt according to claim 1 wherein the joining member has a load side and opposed base sides and opposed outer sides and has a groove extending from one of the opposed outer sides to the other opposed outer side and wherein the groove is for increasing the flexibility of the joining member.

8. A hingeless belt comprising:
   modules,
   layers, and
   joining members and wherein one of the layers connects one of the modules to the joining member and another layer connects another module to the joining member, wherein the joining member has a load side and opposed base sides and opposed outer sides and has a groove extending from one of the opposed outer sides to the other opposed outer side and wherein the groove is for increasing the flexibility of the joining member further including a pair of internal joining member surfaces that face one another and that slope in a direction toward the load side and the internal joining member surfaces define the groove.

9. The hingeless belt according to claim 1 wherein the module has a first base, a second base, an angled leading side that slopes inwardly in a direction toward the second base, and an angled trailing side that slopes inwardly in a direction toward the first base.

10. A hingeless belt comprising:
    modules,
    layers, and
    joining members and wherein one of the layers connects one of the modules to the joining member and another layer connects another module to the joining member wherein the module has a first base, a second base, an angled leading side that slopes inwardly in a direction toward the second base, and an angled trailing side that slopes inwardly in a direction toward the first base wherein the joining member has a load side, a first leg having a first internal leg surface, and a second leg each having a second internal leg surface and wherein each of the first and second legs extends from and slopes in a direction toward a bendable portion that is proximal the load side such that the joining member has a groove that extends from the first internal leg surface to the second internal leg surface.

11. The hingeless belt according to claim 10 wherein the layer joins the angled leading side and the second leg and another layer joins the angled trailing side and the first leg to form the modular belt.

12. The hingeless belt according to claim 1 wherein the module further comprises a first leading wall and a recessed second leading wall with a leading contact wall extending from the first leading wall to the recessed leading wall, and a first trailing wall and a recessed second trailing wall with a trailing contact wall that extends from the first trailing wall to the recessed second trailing wall.

13. The hingeless belt according to claim 12 wherein the joining member has opposed first and second joining member walls, opposed third and fourth joining member walls, wherein a first joining member contact wall extends from the first joining wall to the third joining member wall, and a second joining member contact wall extends from the third joining member wall to the fourth joining member wall.

14. A hingeless belt comprising:
    modules,
    layers, and
    a flight joining member having opposed first and second joining sides, bases, opposed outer sides, and spaced apart flight sides opposite the bases,
    a flight that extends from the joining member such that one of the flight sides is on each side of the flight, wherein the layers connect the flight joining member to the modules; and, wherein the joining member is fixedly attached between modules by molding the joining member between layers.

15. The hingeless belt according to claim 14 wherein the flight has opposed flight surfaces that meet at an end surface, and opposed flight outer sides that are coplanar with the opposed outer sides.

16. The hingeless belt according to claim 14 wherein the flight is at an angle with respect to the modules.

17. The hingeless belt according to claim 14 wherein the flight is reinforced.

18. A hingeless belt comprising:
modules,
layers, and
a flight joining member having opposed first and second joining sides, bases, opposed outer sides, and spaced apart flight sides opposite the bases,
a flight that extends from the joining member such that one of the flight sides is on each side of the flight, and
wherein the layers connect the flight joining member to the modules wherein the flight joining member further comprises facing internal joining member surfaces that slope in a direction toward one another to define a groove in the joining member and the groove for increasing the bendablity of the hingeless belt.

* * * * *